United States Patent
Jahnke

(10) Patent No.: US 6,204,759 B1
(45) Date of Patent: Mar. 20, 2001

(54) AUTOMATIC TURN-SIGNAL DEACTIVATOR

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/476,191

(22) Filed: Jan. 3, 2000

(51) Int. Cl.$^7$ .................................................. B60Q 1/40
(52) U.S. Cl. ........................ 340/476; 340/477; 340/475; 200/61.27
(58) Field of Search .................................. 340/475, 476, 340/477; 200/61.27

(56) References Cited

U.S. PATENT DOCUMENTS

| | | | |
|---|---|---|---|
| 4,660,020 | * 4/1987 | Miyamaru et al. | 340/477 |
| 4,972,174 | * 11/1990 | Onan et al. | 340/477 |

* cited by examiner

*Primary Examiner*—Daryl Pope
(74) *Attorney, Agent, or Firm*—Pedro P. Hernandez; W. James Brady, III; Frederick J. Telecky, Jr.

(57) ABSTRACT

The problem of the turn signal inadvertently remaining on is solved through the use of additional intelligence added on to the current turn-signal control system already existing within current late-model vehicles. The turn-control circuitry in a vehicle first sends a signal to the ABS system indicating to the ABS system that the turn signal has been turned on. The amount of distance traveled from a certain event, such as when the turn signal is turned on, can be ascertained by the ABS system, as distance traveled for odometer purposes has always been a product of the ABS system. Therefore, when a predetermined distance has passed since the turn signal was activated, the ABS system, sends a signal back to the turn-control circuitry, instructing the turn-control circuitry to turn off the turn signal. Upon receiving this turn-off signal from the ABS system, the turn-control system logically "OR's" the ABS signal with its own current turn signal disabling mechanism, such that the turn signal is cleared as a result.

6 Claims, 1 Drawing Sheet

AUTOMATIC TURN-SIGNAL DEACTIVATOR

FIELD OF THE INVENTION

This invention relates in general to electrical systems in vehicles and more particularly to turning off an inadvertently left on turn-signal.

BACKGROUND OF THE INVENTION

Currently, the turn signal on a vehicle remains active until either the vehicle has made a turn or is disabled by the user. In many cases, such as when making a lane change on the highway, not enough of turn was made to cause the switch inside the vehicle to automatically turn-off the turn-signal; and if only to complicate matters, the user driving the vehicle oftentimes forgets to turn off the turn signal after changing lanes. The result is a turn signal left on when there is no intention on the drivers part to turn or to indicate another lane change is pending. Besides being embarrassing for the driver of the vehicle with the signal active, the active turn signal is potentially troublesome for other drivers as they then must decide for themselves if the car with an active turn signal is actually going to turn or to change lanes.

At some point in the mid 90's, a significant portion of the manufacturers of American made vehicles started installing anti-lock break systems (ABS) in all of their current and future stock of vehicles. In addition to providing braking without the risk of locking up the brakes, ABS systems on vehicles also already determine the distance traveled for updating the odometer, and send wheel speed information to the engine control unit.

In addition, with the majority of automotive control systems moving from mechanical to electrical systems, it is possible to add further intelligence to the electrical turn-signal control system without unduly burdening the cost of the system.

SUMMARY OF THE INVENTION

The problem of the turn signal inadvertently remaining on is solved through the use of additional intelligence added on to the current turn-signal control system already existing within current late-model vehicles. The turn-control circuitry in a vehicle first sends a signal to the ABS system indicating to the ABS system that the turn signal has been turned on. The amount of distance traveled from a certain event, such as when the turn-signal is turned on, can be ascertained by the ABS system, as distance traveled for odometer purposes has always been a product of the ABS system. Therefore, when a predetermined distance has passed since the turn signal was activated, the ABS system, sends a signal back to the turn-signal control circuitry, instructing the turn-signal control circuitry to turn off the turn signal. Upon receiving this turn-off signal from the ABS system, the turn-signal control system logically "OR's" the ABS signal with it's own current turn signal disabling mechanism, such that the turn signal is cleared as a result.

DETAILED DESCRIPTION OF THE PREFERRED EMBODIMENTS

Figure 1:
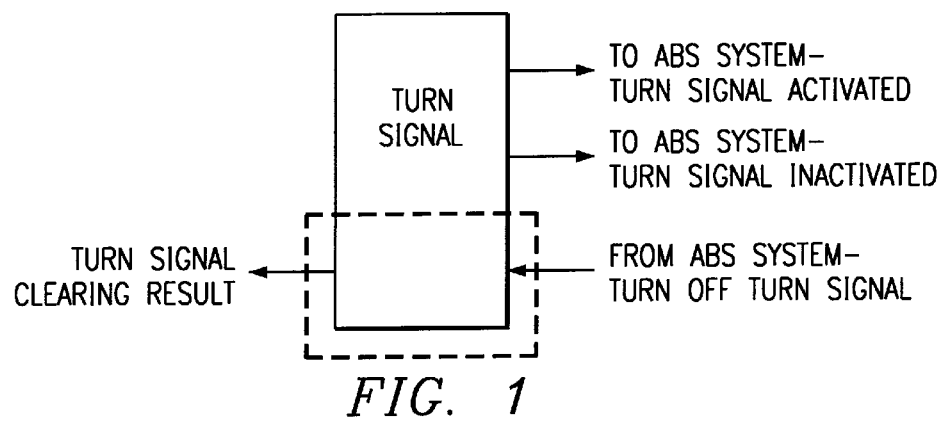
FIG. 1 illustrates the turn-signal control system and the associated input and output signals according to a first preferred embodiment.
Figure 2:
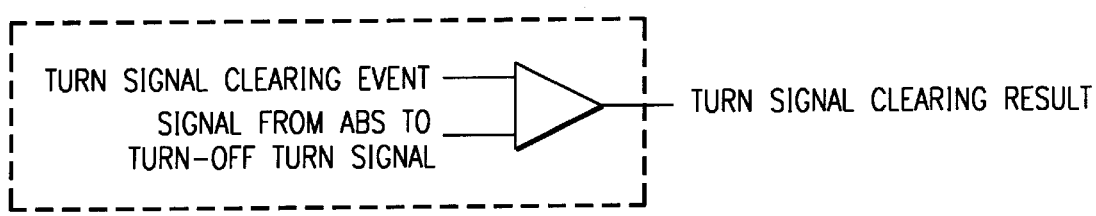
FIG. 2 illustrates the turn-signal clearing event according to said first preferred embodiment.

Currently, the anti-lock brake (ABS) systems on vehicles already determine the distance traveled for updating the odometer and for sending wheel speed information to the engine control unit. According to a first preferred embodiment, the turn-signal control unit, as shown in FIG. 1, sends a signal or a message to the ABS system to indicate that the turn-signal has been activated by the user. If the turn-signal is deactivated, either by the user or because a turn has been made, a second signal or message is sent to the ABS system to indicate that the turn-signal is no longer active. If, however, no such second signal or message is received, and the car has traveled a predetermined amount of distance, then the ABS system sends a message or signal to the turn-signal control unit indicating that the turn-signal should be deactivated. The turn-signal control unit, upon receiving the turn-off signal from the ABS system, logically "OR"s the turn-off signal with the currently existing turn-signal disabling events, i.e. turn signal clearing event, thereby disabling the turn signal. The current invention is operable to be implemented either electrically or electro-mechanically, depending upon the current implementation.

Although logically "OR"ing the turn-off signal from the ABS circuitry and the turn signal clearing event from the turn-signal control circuitry to effect a clearing of the turn-signal is a preferred embodiment, the invention is intended to apply to any kind of connection between the ABS circuitry and the turn-signal control circuitry which results in the turn-signal being cleared In addition, although the turn-off signal from the ABS circuitry is sent in response to both 1) not having received an indication that the turn-signal has been turned off and 2) that a predetermined distance has been traveled since the turn-signal has been turned on, according to a preferred embodiment of the invention, the turn-off signal is also operable to be sent from the ABS circuitry in response to only a predetermined distance being traveled.

The above-identified solution is realized with current systems that already exist within vehicles today. No new additional system-level hardware is required. With additional software on the currently in place ABS system, the above-identified feature can be added. A possible disadvantage to the preferred embodiment of the current invention would be in having to incorporate the turn-signal control unit into the existing car network, (usually via CAN) or adding a physical connection between the ABS system and the turn-signal control circuitry, if one does not already exist.

I claim:

1. A system for turning off a turn-signal left on comprising:

turn-signal control circuitry for transmitting a signal indicating that a turn-signal has been activated upon activation of said turn-signal;

ABS circuitry for receiving said signal and for determining the distance traveled since having received said signal that said turn-signal has been activated; and wherein said ABS circuitry transmits a turn-off signal to said turn-signal control circuitry upon having traveled a predetermined distance since having received said signal that said turn control signal has been activated.

2. The system according to claim 1, wherein said turn control circuitry deactivates said turn signal in response to receiving said turn-off signal from said ABS circuitry.

3. The system according to claim 1, wherein said turn control circuitry has a turn-signal clearing event signal and wherein further, upon receiving said turn-off signal from said ABS circuitry, logically "OR"ing said turn signal clearing event with said received turn-off signal from said ABS circuitry to turn off said turn signal.

4. A system for turning off a turn-signal left on comprising:

turn-signal control circuitry for transmitting a signal indicating that a turn-signal has been activated upon activation of said turn-signal and for transmitting a signal indicating that a turn-signal has been deactivated upon deactivation of said turn-signal;

an ABS circuitry for receiving said signal that a turn-signal has been activated and for receiving said signal that said turn-signal has been deactivated and for determining the distance traveled since having received said signal that said turn-signal has been activated; and wherein said ABS circuitry transmits a turn-off signal to said turn-signal control circuitry upon having not received said signal that said turn-signal has been deactivated and having traveled a predetermined distance since having received said signal that said turn control signal has been activated.

5. The system according to claim 4, wherein said turn control circuitry deactivates said turn signal in response to receiving said turn-off signal from said ABS circuitry.

6. The system according to claim 4, wherein said turn control circuitry has a turn-signal clearing event signal and wherein further, upon receiving said turn-off signal from said ABS circuitry, logically "OR"ing said turn signal clearing event with said received turn-off signal from said ABS circuitry to turn off said turn signal.

* * * * *